(12) United States Patent
Perotti et al.

(10) Patent No.: US 9,697,522 B2
(45) Date of Patent: Jul. 4, 2017

(54) INTERACTIVE DEVICE REGISTRATION, SETUP AND USE

(71) Applicant: Plantronics, Inc., Santa Cruz, CA (US)

(72) Inventors: Erik Perotti, Santa Cruz, CA (US); Todd W Zazelenchuk, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 120 days.

(21) Appl. No.: 14/070,289

(22) Filed: Nov. 1, 2013

(65) Prior Publication Data

US 2015/0124944 A1 May 7, 2015

(51) Int. Cl.
*G06Q 30/00* (2012.01)

(52) U.S. Cl.
CPC .................... *G06Q 30/01* (2013.01)

(58) Field of Classification Search
CPC ............. H04M 3/4936; H04M 1/7253; H04M 2250/02; H04W 8/265; H04W 84/18; H04W 88/06; G06Q 30/012
USPC ......... 455/41.2, 66.1, 556.1, 435.1; 379/88.01–88.19
See application file for complete search history.

(56) References Cited

U.S. PATENT DOCUMENTS

| | | | | |
|---|---|---|---|---|
| 6,163,693 A * | 12/2000 | Rydbeck | ............... | H04M 15/47 455/412.1 |
| 6,240,286 B1 | 5/2001 | Rydbeck | | |
| 6,400,940 B1 | 6/2002 | Sennett | | |
| 6,519,470 B1 | 2/2003 | Rydbeck | | |
| 7,305,070 B2 * | 12/2007 | Kortum | ................. | H04M 3/493 370/356 |
| 7,706,774 B1 * | 4/2010 | Lee | ................... | H04M 3/42136 379/114.2 |
| 7,729,923 B2 * | 6/2010 | O'Connor | ...................... | 705/1.1 |
| 8,213,928 B2 * | 7/2012 | Rohaly et al. | ................ | 455/425 |
| 2005/0014467 A1 * | 1/2005 | Ishiwata et al. | ................ | 455/39 |
| 2009/0238349 A1 * | 9/2009 | Pezzutti | ............... | H04L 41/065 379/93.02 |
| 2009/0252306 A1 * | 10/2009 | Bates | ................... | H04M 11/002 379/88.18 |
| 2010/0332236 A1 * | 12/2010 | Tan | ............................... | 704/275 |
| 2011/0230239 A1 * | 9/2011 | Ueda et al. | ................... | 455/570 |
| 2012/0077438 A1 * | 3/2012 | Jung | ............................ | 455/41.2 |
| 2012/0140904 A1 * | 6/2012 | Li | ......................... | H04M 3/493 379/88.01 |
| 2014/0024312 A1 * | 1/2014 | Guida | ................... | H04W 4/008 455/41.2 |
| 2014/0273855 A1 * | 9/2014 | Jang | ............................ | 455/41.2 |

(Continued)

*Primary Examiner* — Solomon Bezuayehu
(74) *Attorney, Agent, or Firm* — Chuang Intellectual Property Law

(57) ABSTRACT

Methods and apparatuses for interactive device operation are disclosed. In one example, a method for user device operation includes retrieving from a user device memory a user device identifying data, dialing a remote computing device having an interactive voice response (IVR) system, and transmitting the user device identifying data to the remote computing device. The method includes outputting one or more voice messages from the interactive voice response system to a user of the user device, the one or more voice messages associated with a usage of the user device. The method further includes transmitting a user action to the remote computing device made responsive to the one or more voice messages.

23 Claims, 9 Drawing Sheets

(56) References Cited

U.S. PATENT DOCUMENTS

2014/0357215 A1* 12/2014 Michaelis et al. ......... 455/404.2
2015/0120389 A1* 4/2015 Zhang ................... G06Q 10/10
                                                                    705/7.32

* cited by examiner

INTERACTIVE DEVICE REGISTRATION, SETUP AND USE

BACKGROUND OF THE INVENTION

Modern society has seen a proliferation of electronic devices available to the typical person. As a result, people often purchase new types of devices, or upgrade an existing device to a newer model. It is typical for a user who has obtained a new device to simply remove the device from the device packaging and put the device use, not bothering to read the instruction manual.

Both the user and manufacturer are disadvantaged by this user approach. For example, the user may not discover key functionality of the device. Or, the user may not use the device as intended, and therefore have a less than optimal experience or perception of the device. From the manufacturer's perspective, there's a lost opportunity to provide the user with valuable information. The manufacturer provides instruction manuals and other materials such as registration cards not viewed by the end-user, adding to the cost and clutter of packaging. These materials are static, and therefore impossible to 'pull' from the packaging once shipped.

In the prior art, with respect to product registration, the most common approach to device registration is the registration card enclosed within the product packaging. Many end-users simply do not take the time to register their purchased product, viewing it as undesirably time-consuming to fill out the card and mail it to the manufacturer. Some manufacturers attempt to entice customers to do so with giveaways, coupons, or other incentives, but these attempts are often ineffective.

In the prior art, with respect to device set up and use, most manufacturers provide an instruction manual. However, these manuals are often poorly written and difficult to understand. Even in the best case scenario, these manuals can be difficult for some users to comprehend and remember. In certain cases, manufacturers utilize QR code technology, where a small, scannable bar code is used to encode a website URL related to a product. However, this method suffers from low adoption rates due to the need for additional scanning software and unreliable quality.

As a result, improved methods and apparatuses for determining a person's status are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
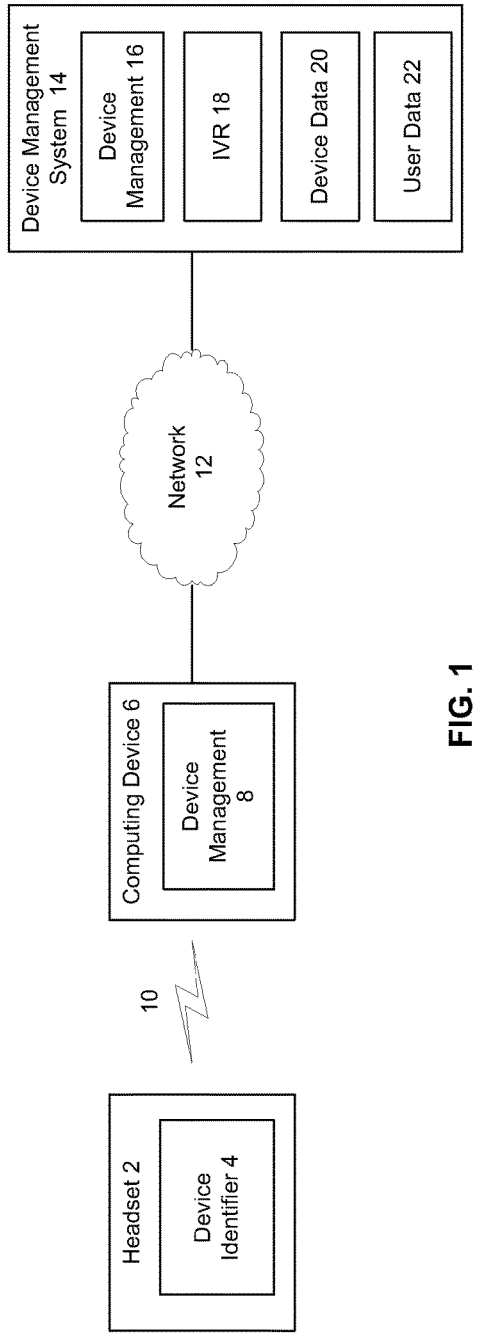
FIG. 1 illustrates a system for user device operation in one example.

Methods and apparatuses for interactive device operation are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

In one example, a method for user device operation includes retrieving from a user device memory a user device identifier data, dialing a remote computing device comprising an interactive voice response (IVR) system, and transmitting the user device identifier data to the remote computing device. The method includes outputting one or more voice messages from the interactive voice response system to a user of the user device, the one or more voice messages associated with a usage of the user device. The method further includes transmitting a user action to the remote computing device made responsive to the one or more voice messages.

In one example, one or more non-transitory computer-readable storage media have computer-executable instructions stored thereon which, when executed by one or more computers, cause the one more computers to perform operations including forming a first communications link with a user device having a user device memory, and receiving a user device identifier data stored in the user device memory. The operations include forming a second communications link with a remote computing device, the remote computing device comprising an interactive voice response (IVR) system, and receiving one or more voice messages from the interactive voice response system to transmit to the user device for output to the user, wherein the one or more voice messages are associated with a usage of the user device. The operations further include receiving a user action from the user device to transmit to the remote computing device, the user action made responsive to the one or more voice messages.

In one example, one or more non-transitory computer-readable storage media have computer-executable instructions stored thereon which, when executed by one or more computers, cause the one more computers to perform operations including forming a first communications link with a user device having a user device memory, and receiving a user device identifier data stored in the user device memory. The operations include forming a second communications link with a remote computing device, and receiving one or more messages from the remote computing device to transmit to the user device for output to the user. The one or more messages are associated with a registration of the user device, setup of the user device, testing a proper operation of the user device, or instructions related to usage of the user device. The operations further include receiving a user action from the user device to transmit to the remote computing device, the user action made responsive to the one or more messages.

In one example, a system for device operating includes a computing device, a headset, and a mobile device. The computing device includes a computing device processor, a computing device communications interface, and an interactive voice response system. The headset includes a headset processor, a headset communications interface, and a user interface comprising a speaker, a microphone, and an input button. The headset further includes a memory storing a headset identifier.

The mobile device includes a mobile device processor, a first mobile device communications interface operable to form a link with the headset communications interface, and a second mobile device communications interface operable to form a link with the computing device communications interface. The mobile device further includes a mobile device memory including a headset management application configured to receive the headset identifier from the headset, transmit the headset identifier to the computing device, receive one or more voice messages from the interactive voice response system to transmit to the user device for output to the user, wherein the one or more voice messages are associated with a usage of the headset, and receive a user action from the headset to transmit to the remote computing device, the user action made responsive to the one or more voice messages. In one example, the headset management application calls a dial-in number for the computing device to initiate communications with the interactive voice response system.

In one example, apparatuses and methods are described for passing user device configuration to an interactive voice response (IVR) system to automate key tasks. For example, device information is transmitted automatically to the manufacturer using voice, SMS, or other communication protocols. In one example, telephony call flow is tested and user knowledge relating to operation of user devices is tested and confirmed, providing value to both the manufacturer and end user.

In one example, when a user pairs a new headset with her smartphone, the user is asked if she would like to test the new connection. This may be the first step in a companion application, or may be built into the Bluetooth pairing operation. If the user confirms interest in testing the new user device, numeric codes representing the device model name/number and specific serial number unique to that particular device are parsed and dialed to a preset interactive voice response system. For example, the serial number is generated by the asset manufacturer and stored in the device memory. The IVR system is configured to receive this data as it has been parsed by the mechanism within the smartphone.

In one example embodiment, upon processing these data, the IVR system generates an automated reply in the form of a phone call back to the originating number. This includes a pre-recorded welcome message that serves as a test of the user's new headset audio. This is also a test of the device workflow for call-connect, communication and other interaction.

In another embodiment, the IVR system offers additional options to the user, such as getting started, a tailored walkthrough based on device type, and so forth. The tailored walkthrough is particularly attractive, because the system can respond to user events. For example, if the user unsuccessfully mutes her device the first time, she could be informed from the automated system that her mute has not been enabled. The inventors have recognized that some people respond better to auditory instruction and interactive experience rather than simply reading written instructions.

Furthermore, because the system is dynamic, the data can be updated on an as-needed basis. For example, through trial and error, a manufacturer could determine the optimal 'how to' instructions for a complicated task. For example, the exact verbiage for how to press the headset mute button.

In one example operation, the user pairs her mobile phone to a new device, such as a Bluetooth pairing process of a headset device. Bluetooth uses a process called pairing to control which devices are allowed to connect to a given Bluetooth device and establish a connection without user intervention (e.g., as soon as the devices are in range). The pairing process is triggered either by a specific request from a user to pair devices, or it is triggered automatically when connecting to a service for the first time where the identity of a device is required.

The user is asked if she would like to test her new device by an application residing on the mobile phone. After the user indicates 'yes', the mobile phone automatically dials into the IVR system and passes the model number and unique identifier (ID) for the user device. The IVR now can record the phone number and relevant unique ID for this device. The phone model can also be captured, to help with future troubleshooting. The IVR then responds with a list of options to guide the user through the latest information related to their device. For example, the system has voice automated "Say your name" to record the name associated with the device registration. The system outputs voice messages such as "Thanks for choosing the revolutionary [model name] from your friends at [name of manufacturer]. Press 1 if you would you like to test your new DEVICE_NAME. Press 2 to go through an interactive tutorial . . . ."

In one example, methods and apparatuses are presented for troubleshooting user devices. For example, leveraging the same system, the user dials into the IVR system to diagnose and repair issues with their headset. This includes IVR menu traversal and detection of device settings that may need adjustment. For example, the user can self-test that their device works well under a specific condition, such as by calling into the automated system to record and play back her sound quality, and tune it to the specific conditions.

In one example, by connecting to the IVR system via the device management system (e.g., a mobile device application), the user can troubleshoot potential audio quality issues by having the IVR system detect and analyze degraded audio quality and provide guidance to the user to correct the problem (e.g. change the microphone boom angle, etc.).

In one example, for headsets that contain sensors, there may be scenarios where the data is in error due to poor placement or malfunction. In such cases, the device management system could pass the details through to the IVR system via the parsing technology, and the IVR system could in turn detect and provide audio guidance back to the user to help remedy the situation. In one example, by sending a voice response to the system, the user can evaluate the quality of their audio when the system records their audio and plays it back to the user.

In a further example, as part of a call center flow, a user may be asked to run through an interactive battery of tests before connection to a call center representative to verify that the user understands device operation before proceeding to a live customer support agent. This might guide the diagnostic portion of the live call or eliminate the need for the live call in its entirety.

Advantageously, the device manufacturer receives real benefits. The manufacturer reduces material costs with set up materials, resulting in environmental benefit as well. Furthermore, this is a dynamic system, so the manufacturer can tune messaging and information as needed. A further key benefit is with troubleshooting and maintenance. If it is known that key features of a device had been working at some known time, then that could be used as a baseline for support.

In a further example, a wearable device is registered through an SMS (via a companion device that has Internet connectivity) to a similar server system. In this case, the wearable device transmits its unique ID to the manufacturer by way of a host communications device. Because the host communications device is connected to both the manufacturer and device, it can be leveraged to provide interactive training (a screen surrogate) for the wearable device.

Advantageously, in certain examples, audio-enabled setup and registration represent relevant, value-added features to be included in mobile applications that are integrated with Bluetooth audio devices. Applications such as MyHeadset™, Instant Meeting, and Messenger (SMS & Calendar Events) currently integrate deeply with users' Bluetooth audio devices. These applications permit users to locate user guide information for their specific devices, connect remotely to online meetings, and hear their SMS and calendar event details read aloud through their headset. By incorporating additional audio-enabled functionality during the setup process within such applications, a users' first-time use experience can effectively be enhanced by being able to test the controls, behavior and sound quality of their new device, and by easily and more quickly registering their device with the manufacturer.

FIG. 1 illustrates a system for user device operation in one example. In one example, the user device is a headset 2, and the system includes a device management system 14, a headset 2, and a computing device 6. For example, device management system 14 is a remote computing device, such as a server in one embodiment. For example, computing device 6 may be a smartphone, laptop, or tablet computer. The device management system 14 includes a device management application 16 interacting with an interactive voice response system 18, device data 20, and user data 22 to perform functions described herein. The headset 2 includes a memory storing a device identifier 4. For example, the user device identifier 4 is a headset model number, a unique serial number, or both. The computing device 6 includes a device management application 8. Computing device 6 and headset 2 communicate over a communications link 10. For example, communications link 10 may be a short-range wireless link such as a Bluetooth link. Computing device 6 is operable to form a communications link with device management system 14 via a network 12. For example, network 12 may be an Internet Protocol (IP) network, cellular communications network, public switched telephone network (PSTN), or some combination thereof.

In one example operation, device management application 8 is operable to receive the device identifier 4 from the headset 2 over communications link 10, and transmit the device identifier 4 to the device management system 14 via network 12. In one example, the device management application 8 calls a dial-in number for the device management system 14 to initiate communications with the interactive voice response system 18. For example, the dial-in number may be stored within device management application 8 or received from headset 2 together with device identifier 4. In one embodiment, the dial-in is performed automatically as part of a Bluetooth pairing process between headset 2 and computing device 6.

Device management system 14 receives the device identifier 4 and retrieves device data 20 associated with the headset 2. Device data 20 may be stored for each headset model number or model type. For example, device data 20 may include user instructions for proper use of the headset 2, registration information, and default device settings. Device management system 14 utilizes IVR system 18 to interact with the user of headset 2 to retrieve the appropriate data from device data 20.

Device management application 8 is configured to receive one or more voice messages from the interactive voice response system 18 to transmit to the headset 2 for output to the user, wherein the one or more voice messages are associated with a usage of the headset 2. In one example, the one or more voice messages from the interactive voice response system 18 are associated with a registration of the headset 2, setup of the headset 2 (e.g., device settings), or instructions related to usage of the headset 2.

With respect to registration of the headset 2, the IVR messages may prompt the user to speak her name, address, phone number. The user response detected at the headset microphone is then transmitted to device management system 14, converted to text data using a speech-to-text application, and stored in user data 22 associated with with the device identifier 4.

With respect to instructions related to usage of the headset, the IVR messages may instruct the user on various features and functionality of headset 2, including step-by-step instructions on how to perform various headset functions. For example, such functions may include call answer, call terminate, mute, call flash. Any material previously typically provided in a written instruction manual may be provided to the user in the IVR messages. In one example, the one or more voice messages from the interactive voice response system are associated with an instruction related to usage of the user device and the user action made in response to the IVR message is processed to determine whether the instruction has been properly completed by the user. For example, IVR messages may instruct the user on how to mute a call and then prompt the user to mute the call by performing the proper user interface action at the headset. Upon hearing the IVR message prompt, the user performs a mute action at the headset user interface, which is transmitted to device management system 14 and processed to identify whether the user has properly muted the call. If yes, an IVR message is sent to the user informing her that she has performed the assigned task correctly. In this manner, it can be confirmed that the user can properly perform any functionality offered by the headset 2 and properly operate the headset 2.

With respect to setup of the headset 2, the IVR messages may instruct the user to configure various device settings which are user adjustable on headset 2. For example, such settings may include default volume levels during calls.

Since the volume level is set while on the call with device management system 14, the user can advantageously determine the desired volume level based on the heard volume of the IVR messages. Similarly, other device settings may be configured automatically that are not typically set by the user. For example, the received user speech at the device management system 14 is processed and analyzed to determine whether the headset transmit signal processing parameters need to be adjusted at the headset, such as microphone gain levels and noise reduction settings related to sound quality. In one example, the one or more voice messages from the interactive voice response system and the user action are associated with testing a proper operation of the user device. User device settings may be adjusted responsive to testing the proper operation of the user device.

Device management application 8 is further configured to receive a headset user action from the headset 2 to transmit to the remote device management system 14, the user action made responsive to the one or more voice messages. For example, the user action is a voice message received at the headset microphone or an input action received at the headset user interface.

In one example embodiment, when computing device 6 calls the dial-in number for device management system 14, caller identification data is detected by device management system 14, the caller identification data including a call back number for computing device 6. In one example, following receipt of the device identifier 4, device management system 14 terminates the received call from computing device 6 and initiates a call to computing device 6 using the call back number. In one example, the call back is performed at any time during the call as part of the user instruction process. In response to the call back, the user performs one or more actions at headset 2. In one example, these user actions at headset 2 are operable to test a proper operation of the headset 2 or test the user's knowledge of how to operate the headset 2 properly. Advantageously, the call-back provides the opportunity to the user to practice answering a call using a particular technique.

For example, the IVR messages may instruct the user on a method for answering a call. The call is terminated, and a call-back is made to the headset 2 so that the user can answer the call using the instructed technique. This process may be repeated several times in succession (i.e., several call backs are initiated) so that the user can practice all the available call-answer techniques. The call back feature also enables the user to confirm that her headset 2 is operating properly or as desired. For example, the call back feature allows the user to determine whether the headset 2 has been paired correctly with computing device 6 and is outputting a ring tone at a desired volume level.

In a further example, the user device is another type of computing device, such as a wrist-worn device, instead of headset 2. In one example, text based messages are used in place of the voice messages described above.

Figure 2:
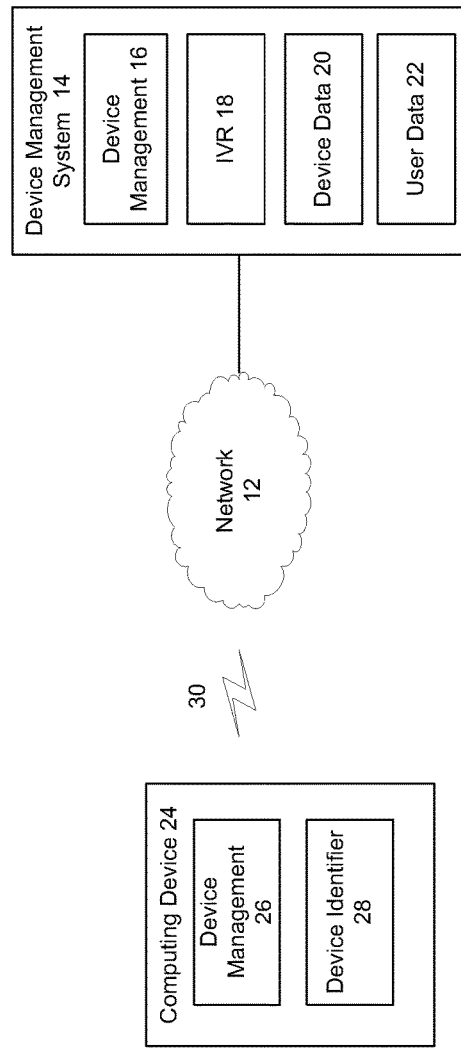
FIG. 2 illustrates a system for user device operation in a further example.

FIG. 2 illustrates a system for user device operation in a further example. The system includes a computing device 24 and a device management system 14. The computing device 24 includes a device management application 26 and a device identifier 28. Computing device 24 is operable to form a communications link with device management system 14 via a network 12, such as by connecting to network 12 via a wireless link 30.

In one example operation, device management application 26 is operable to receive the device identifier 28 from the memory of computing device 24, and transmit the device identifier 28 to the device management system 14 via network 12. In one example, the device management application 26 calls a dial-in number for the device management system 14 to initiate communications with the interactive voice response system 18. For example, the dial-in number is stored within device management application 26.

Device management system 14 receives the device identifier 28 and retrieves device data 20 associated with computing device 24. Device data 20 may be stored for different model numbers or model types. For example, device data 20 may include user instructions for proper use of the computing device 24, registration information, and default device settings. Device management system 14 utilizes IVR system 18 to interact with the user of computing device 24 to retrieve the appropriate data from device data 20.

Device management application 26 is configured to receive one or more voice messages from the interactive voice response system 18 to output to the user, wherein the one or more voice messages are associated with a usage of the computing device 24. In one example, the one or more voice messages from the interactive voice response system 18 are associated with a registration of the computing device 24, setup of the computing device 24 (e.g., device settings), or instructions related to usage of the computing device 24. Additional operation of computing device 24 and device management system 14 may be as described above with respect to FIG. 1 with operation of headset 2 and computing device 6 integrated into single device computing device 24.

Figure 3:
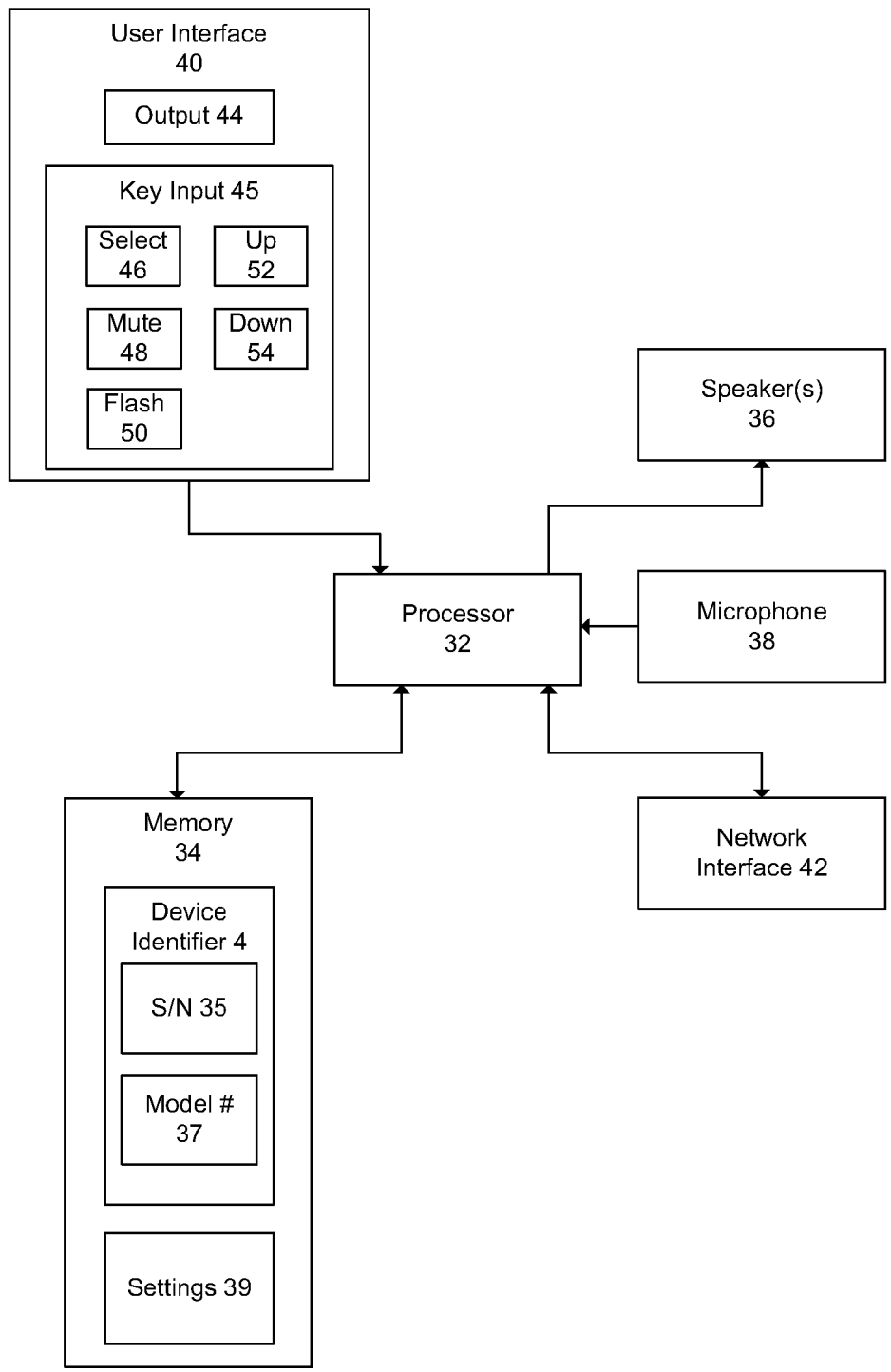
FIG. 3 illustrates a simplified block diagram of the headset shown in FIG. 1.

FIG. 3 illustrates a simplified block diagram of the headset shown in FIG. 1 to implement one or more of the examples described herein. Examples of headset 2 include telecommunications headsets. The term "headset" as used herein encompasses any head-worn device operable as described herein.

In one example, a headset 2 includes a processor 32, a memory 34, a network interface 42, speaker(s) 36, a microphone 38 for receiving sound, and a user interface 40. In one implementation, speaker(s) 36 include a first speaker worn on the user left ear to output a left channel of a stereo signal and a second speaker worn on the user right ear to output a right channel of the stereo signal. The user interface 40 may include a multifunction power, volume, mute, and select button or buttons. Other user interfaces may be included on the headset, such as a link active/end interface. In the example shown in FIG. 3, the user interface 40 includes an output interface 44 typical to headsets, such as LED indicators or some form of a display, and a key input 45. Key input 45 includes a select command 46, mute command 48, flash command 50, up command 52, and down command 54. It will be appreciated that numerous other configurations exist for the user interface. Advantageously, in certain examples, the methods and apparatuses described herein assist the user in learning operation of different devices having different user interfaces, including providing instructions to the user on how to operate the headset user interface and testing whether the user has performed user interface actions properly.

Headset 2 includes a processor 32 operating as a controller that may include one or more processors, memory and software to implement functionality as described herein. The processor 32 receives input from user interface 40 and manages audio data received from microphone 38 and audio from computing device 6 sent to speaker(s) 36 (e.g., audio from IVR 18 sent from device management system 14). The processor 32 further interacts with network interface 42 to transmit and receive signals between the headset 2 and computing device 6.

Memory 34 represents an article that is computer readable. For example, memory 34 may be any one or more of the following: random access memory (RAM), read only memory (ROM), flash memory, or any other type of article that includes a medium readable by processor 32. Memory 34 can store computer readable instructions for performing the execution of the various method embodiments of the present invention. Memory 34 includes a device identifier 4 which may be retrieved and sent to computing device 6. For example, device identifier 4 may include a serial number 35 and/or a model number 37. Memory 34 also includes headset settings 39 related to operation of the headset 2 which may be configured, tested, and adjusted as described herein.

Network interface 42 allows headset 2 to communicate with other devices. Network interface 42 may include a wired connection or a wireless connection. Network interface 42 may include, but is not limited to, a wireless transceiver, an integrated network interface, a radio frequency transmitter/receiver, a USB connection, or other interfaces for connecting headset 2 to a telecommunications network such as a Bluetooth network, cellular network, the PSTN, or an IP network. For example, network interface 42 is a Bluetooth, Digital Enhanced Cordless Telecommunications (DECT), or IEEE 802.11 communications module configured to provide the wireless communication link. Bluetooth, DECT, or IEEE 802.11 communications modules include an antenna at both the receiving and transmitting end.

In a further example, the network interface 42 may include a controller which controls one or more operations of the headset 2. Network interface 42 may be a chip module. The headset 2 further includes a power source such as a rechargeable battery which provides power to the various components of the headset 2.

Figure 4:
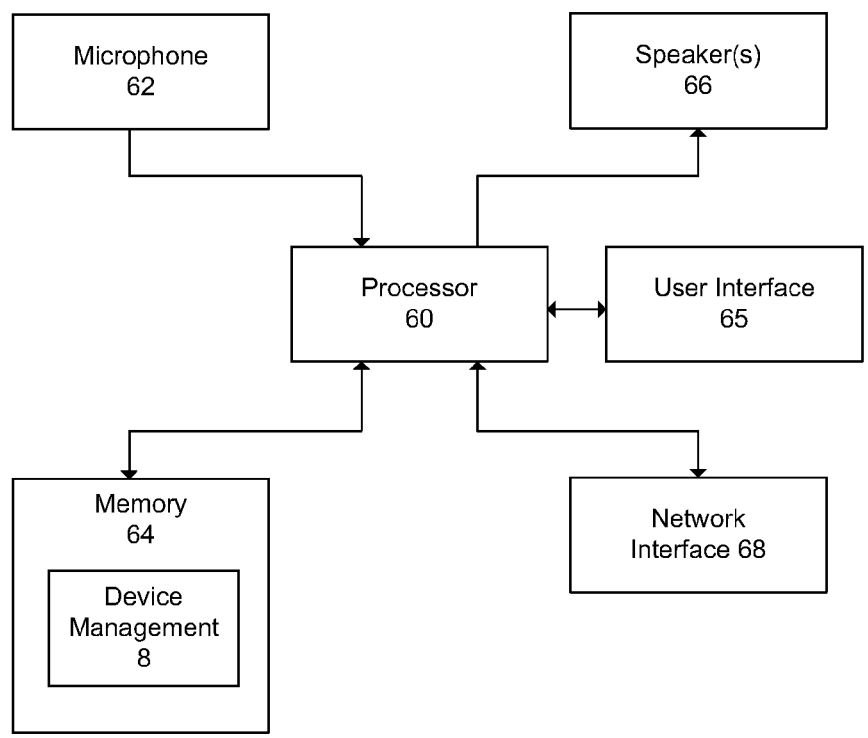
FIG. 4 illustrates a simplified block diagram of the computing device shown in FIG. 1.

FIG. 4 illustrates a simplified block diagram of the computing device 6 shown in FIG. 1 configured to implement one or more of the examples described herein. Examples of computing device 6 include, without limitation, smartphones, laptop or notebook computers, desktop computers, or tablet computers. In one example, computing device 6 includes a microphone 62, a user interface 65, speaker(s) 66, a memory 64, and a network interface 68. Computing device 6 includes a digital-to-analog converter (D/A) coupled to speaker(s) 66 and an analog-to-digital converter (A/D) coupled to microphone 62. In one example, the network interface 68 is a wireless transceiver or a wired network interface.

Memory 64 represents an article that is computer readable. For example, memory 64 may be any one or more of the following: random access memory (RAM), read only memory (ROM), flash memory, or any other type of article that includes a medium readable by processor 60. Memory 64 can store computer readable instructions for performing the execution of the various method embodiments of the present invention. In one example, the processor executable computer readable instructions are configured to perform part or all of a process such as that shown in FIGS. 7A-9. Computer readable instructions may be loaded in memory 64 for execution by processor 60.

Network interface 68 includes interfaces which allow computing device 6 to communicate with other devices. Network interface 68 may include wired connections, wireless connections, or both wired and wireless connections. Network interface 68 may include, but is not limited to, a wireless transceiver, an integrated network interface, a radio frequency transmitter/receiver, a USB connection, or other interfaces for connecting computing device 6 to a telecommunications network such as a Bluetooth network, cellular network, the PSTN, or an IP network.

In one example operation, processor 60 executes a device management application 8 to perform functions described herein. Processor 60 executing device management application 8 performs operations including forming a first communications link with headset 2, and receiving a device identifier 4 stored in the headset memory. The operations include forming a second communications link with a device management system 14, the device management system 14 including interactive voice response (IVR) system 18, and receiving one or more voice messages from the interactive voice response system 18 to transmit to the headset 2 for output to the user, wherein the one or more voice messages are associated with a usage of the headset 2. For example, the one or more voice messages from the interactive voice response system are associated with a registration of the headset 2, setup of the headset 2, or instructions related to usage of the headset 2.

In one example, the second communications link is formed by calling a dial-in number for the device management system 14. In one embodiment, the second communications link is terminated following transmission of the headset identifier data, and a call back is received from the device management server and answered to re-connect the second communications link. A user action is received responsive to the call, the user action operable to test a proper operation of the user device.

The operations include receiving a user action from the headset 2 to transmit to the device management system 14, the user action made responsive to the one or more voice messages. In one example, the user action at the headset is speaking a voice message or an input action received at the headset user interface.

Figure 5:
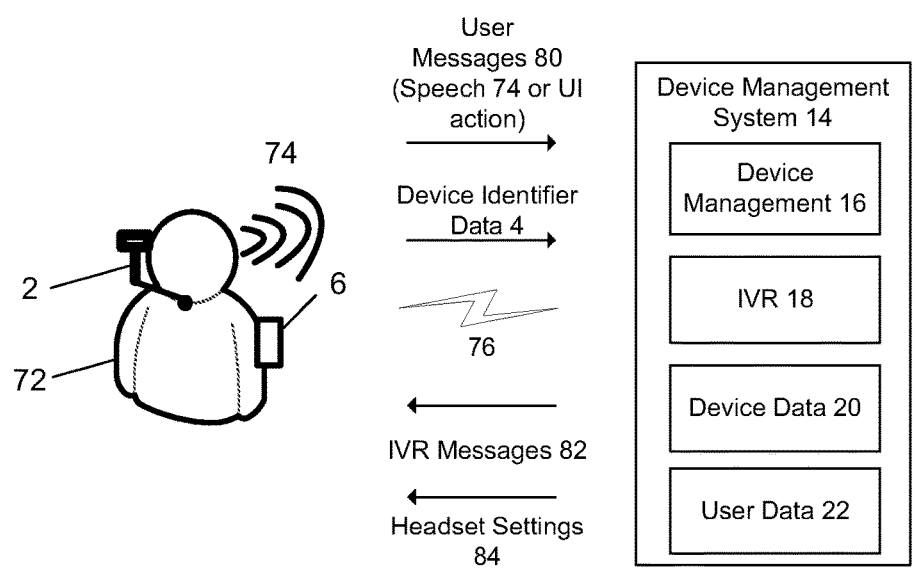
FIG. 5 illustrates a sample operation of the system shown in FIG. 1.

FIG. 5 illustrates a sample operation of the system shown in FIG. 1 in which the computing device 6 executes device management application 8. In the example shown in FIG. 5, a headset user 72 is utilizing a computing device 6 (e.g., a mobile phone) in conjunction with headset 2 to conduct a telephony voice call with device management system 14. Headset 2 detects speech 74 from headset user 72.

In operation, computing device 6 forms a communications link 76 with device management system 14 by dialing-in to device management system 14. As previously described communications link 76 may be formed by receiving a call-back from device management system 14 at computing device 6 following an initial dial-in. Device identifier 4 and user messages 80 are transmitted to device management system 14. User messages 80 may include both speech 74 and user interface actions made by the user at the headset 2 user interface and computing device 6 user interface. In one example, user messages 80 include registration information such as the user name, address, etc., which are stored as user data 22 at device management system 14. This registration information is stored with the device identifier 4. IVR messages 82 and headset settings 84 are transmitted from device management system 14 to computing device 6 for relay to headset 2. In one example, IVR messages 82 include data from device data 20 corresponding to the device identifier 4.

Figure 6:
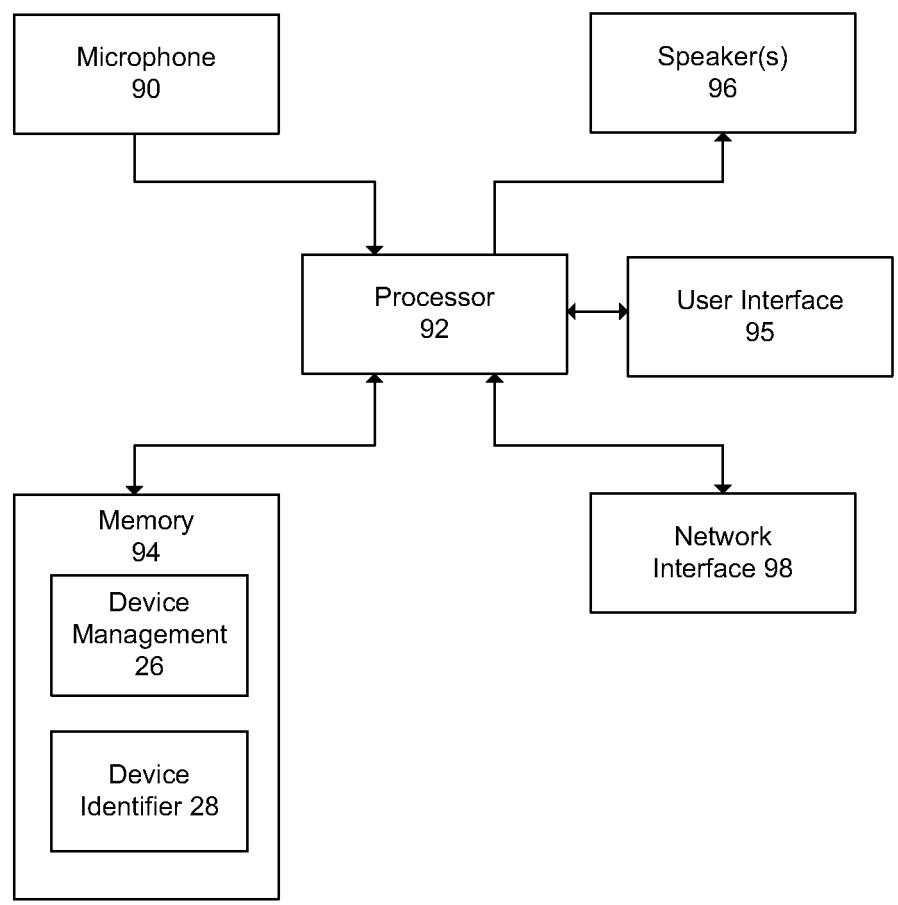
FIG. 6 illustrates a simplified block diagram of the computing device shown in FIG. 2.

FIG. 6 illustrates a simplified block diagram of the computing device 24 shown in FIG. 2 configured to implement one or more of the examples described herein. Examples of computing device 24 include, without limitation, smartphones, laptop or notebook computers, desktop computers, or tablet computers. In one example, computing device 24 includes a microphone 90, a user interface 95, speaker(s) 96, a memory 94, and a network interface 98. In one example, the network interface 98 is a wireless transceiver or a wired network interface.

Memory 94 represents an article that is computer readable. For example, memory 94 may be any one or more of the following: random access memory (RAM), read only memory (ROM), flash memory, or any other type of article that includes a medium readable by processor 92. Memory 94 can store computer readable instructions for performing the execution of the various method embodiments of the present invention. In one example, the processor executable computer readable instructions are configured to perform part or all of a process such as that shown in FIGS. 7A-9. Computer readable instructions may be loaded in memory 94 for execution by processor 92.

Network interface 98 includes interfaces which allow computing device 24 to communicate with other devices. Network interface 98 may include wired connection, wireless connections, or both wired and wireless connections. Network interface 98 may include, but is not limited to, a wireless transceiver, an integrated network interface, a radio frequency transmitter/receiver, a USB connection, or other interfaces for connecting computing device 24 to a telecommunications network such as a Bluetooth network, cellular network, the PSTN, or an IP network.

In one example operation, processor 92 executes a device management application 26 to perform functions described herein. Processor 92 executing device management application 26 performs operations including retrieving a device identifier 28 stored in memory 94. The operations include forming a link with a device management system 14, the device management system 14 including interactive voice response (IVR) system 18, and receiving one or more voice messages from the interactive voice response system 18 for output to the user at user interface 95, wherein the one or more voice messages are associated with a usage of the computing device 24. For example, the one or more voice messages from the interactive voice response system are associated with a registration of the computing device 24, setup of the computing device 24, or instructions related to usage of the computing device 24

In one example, the communications link is formed by calling a dial-in number for the device management system 14. In one embodiment, the communications link is terminated, and a call back is received from the device management server and answered to re-connect the communications link. A user action is received responsive to the call, the user action operable to test a proper operation of the computing device 24.

The operations include receiving a user action at computing device 24 to transmit to the device management system 14, the user action made responsive to the one or more voice messages. In one example, the user action at the computing device 24 is speaking a voice message or an input action received at the user interface 95.

Figure 7A:
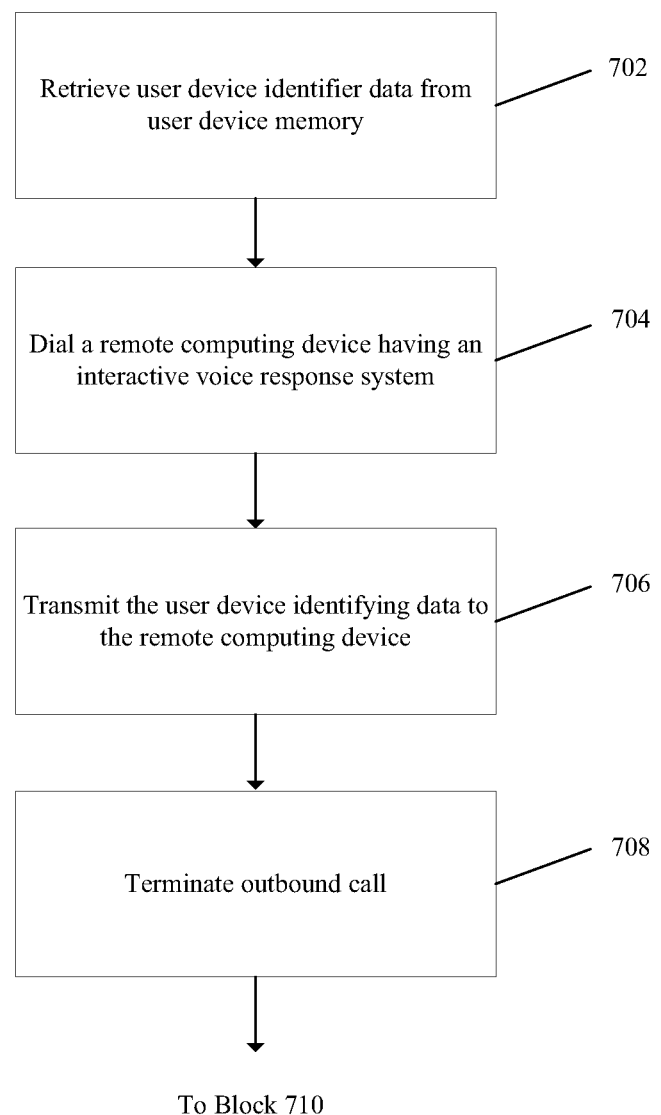
FIGS. 7A and 7B are a flow diagram illustrating operation of a user device in one example.
Figure 7B:
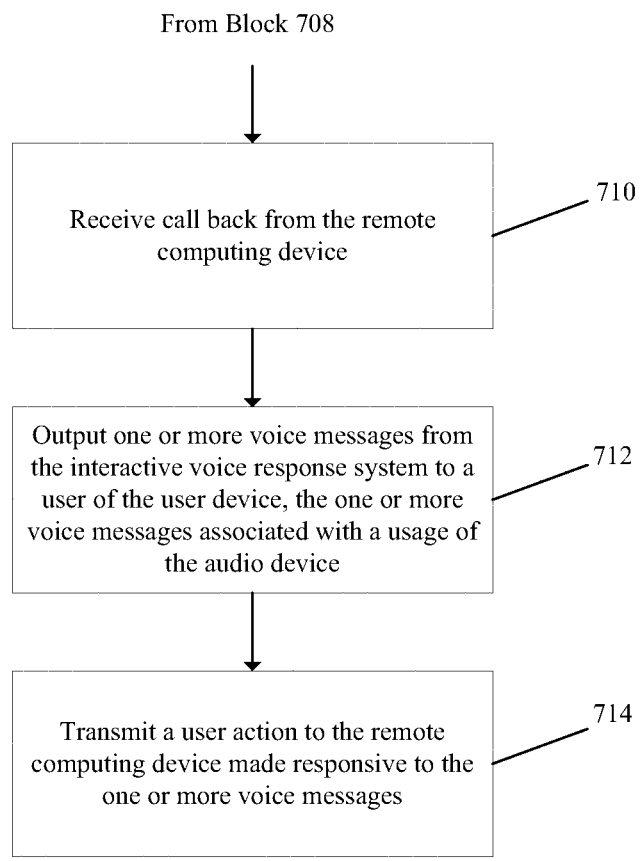

FIGS. 7A and 7B are a flow diagram illustrating operation of a user device in one example. At block 702, a user device identifier data is retrieved or received from a user device memory. In one example, the user device identifier data includes a model number or a serial number.

At block 704, a remote computing device having an interactive voice response (IVR) system is dialed. In one example, the remote computing device is dialed as part of a Bluetooth pairing process of the user device. In one example, dialing the remote computing device includes retrieving a dial-in number for the remote computing device from the user device memory. In one example, dialing the remote computing device includes transmitting a caller identification data to the remote computing device.

At block 706, the user device identifier data is transmitted to the remote computing device. At block 708, the outbound call is terminated. At block 710, a call-back is received from the remote computing device. A user action to answer the call is received. In one example, the user action is operable to test a proper operation of the user device.

At block 712, one or more voice messages are output from the interactive voice response system to a user of the user device, the one or more voice messages associated with a usage of the user device. In one example, the method further includes retrieving data at the remote computing device associated with the user device. In one example, the one or more voice messages from the interactive voice response system are associated with a registration of the user device, setup of the user device (e.g., device settings), or instructions related to usage of the user device.

In one example, the one or more voice messages from the interactive voice response system and the user action are associated with testing a proper operation of the user device as previously described. In one embodiment, a user device setting is adjusted responsive to testing the proper operation of the user device as previously described. In one example, the one or more voice messages from the interactive voice response system are associated with an instruction related to usage of the user device and the user action is processed to determine whether the instruction has been properly completed by the user.

At block 714, a user action is transmitted to the remote computing device made responsive to the one or more voice messages. In one example, the user action is a voice message or an input action received at a user device user interface of the user device. In one example the user action is a voice response, wherein the voice response is processed by remote computer to determine a signal processing parameter device setting (e.g., noise reduction, volume level, etc.).

Figure 8:
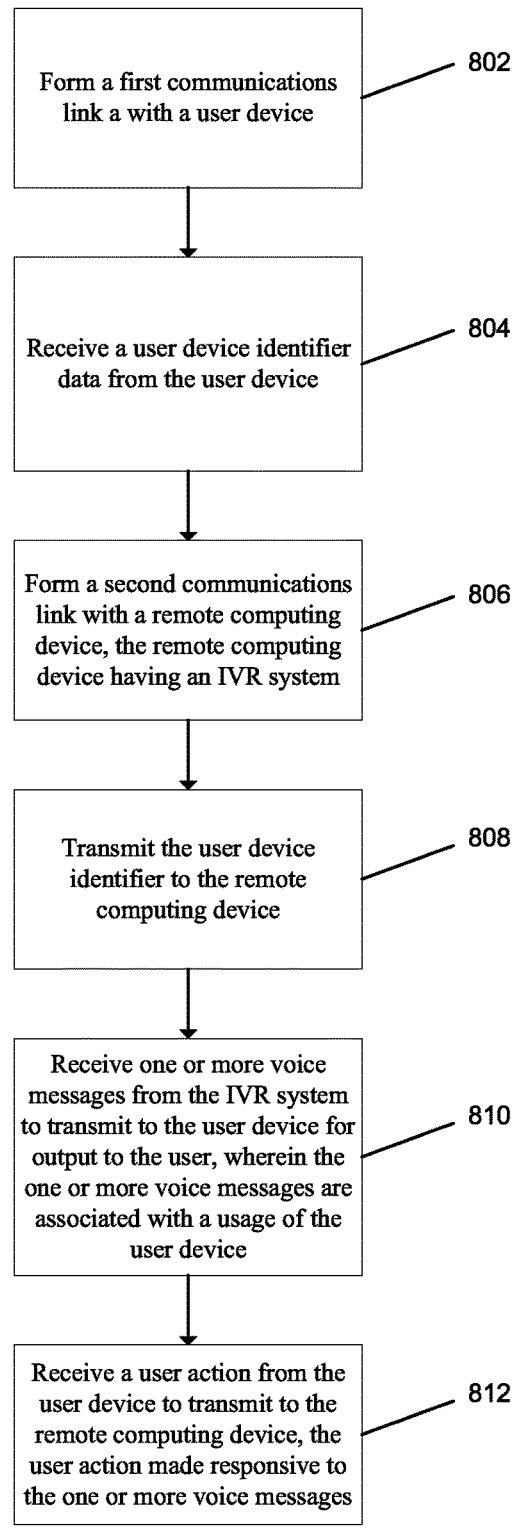
FIG. 8 is a flow diagram illustrating operation of a user device in a further example.

FIG. 8 is a flow diagram illustrating operation of a user device in a further example. At block 802, a first communications link with a user device is formed. At block 804, a user device identifier data is received from the user device. In one example, the user device identifier data includes a model number or a serial number. At block 806, a second communications link is formed with a remote computing device, the remote computing device having an interactive voice response system. In one example, the user device is a headset and a smartphone forms the first communications link and the second communications link.

In one example, the second communications link is formed by dialing the remote computing device. In one embodiment, operations include terminating the second connection following transmission of the user device identifier data to the remote computing device, receiving a call from the remote computing device, and receiving a user action responsive to the call, the user action operable to test a proper operation of the user device At block 808, the user device identifier is transmitted to the remote computing device. At block 810, one or more voice messages are received from the IVR system to transmit to the user device for output to the user, wherein the one or more voice messages are associated with a usage of the user device.

In one example, the one or more voice messages from the interactive voice response system are associated with a registration of the user device, setup of the user device, or instructions related to usage of the user device. In one example, the one or more voice messages from the interactive voice response system and the user action are associated with testing a proper operation of the user device as previously described. For example, a user device setting is adjusted responsive to testing the proper operation of the user device as previously described. In one example, the one or more voice messages from the interactive voice response system are associated with an instruction related to usage of the user device and the user action is processed to determine whether the instruction has been properly completed by the user.

At block 812, a user action is received from the user device to transmit the remote computing device, the user action made responsive to the one or more voice messages. In one example, the user action is a voice message or an input action received at a user device user interface.

Figure 9:
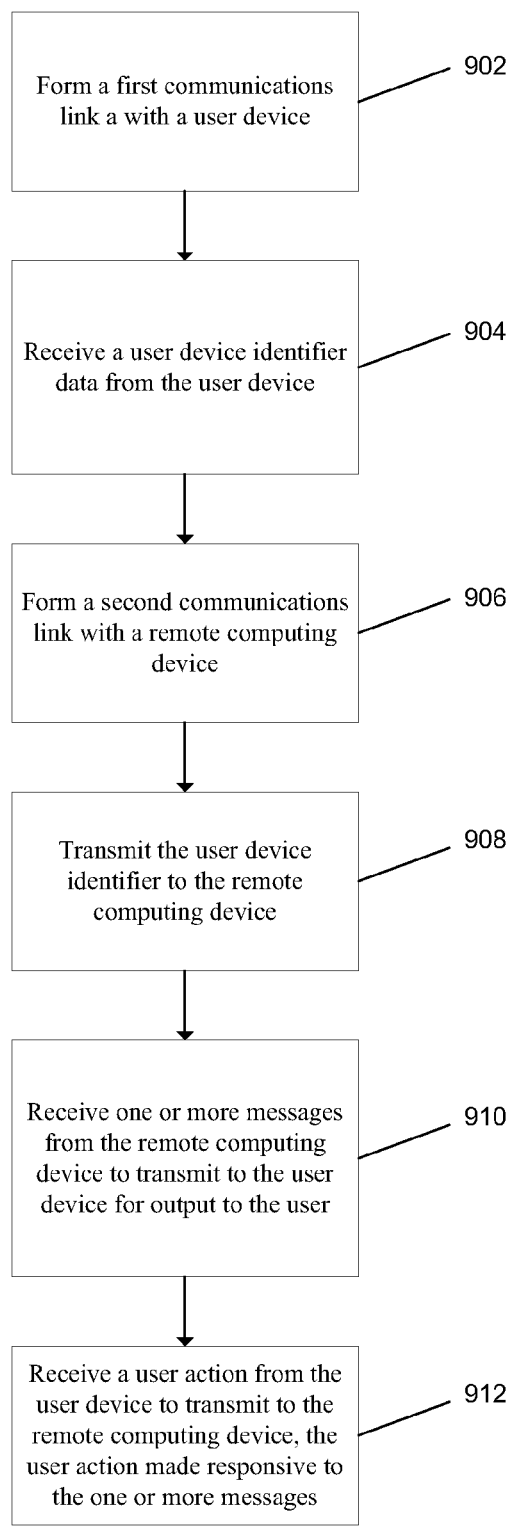
FIG. 9 is a flow diagram illustrating operation of a user device in a further example.

FIG. 9 is a flow diagram illustrating operation of a user device in a further example. At block 902, a first communications link is formed with a user device. At block 904, a user device identifier data is received from the user device. In one example, the user device identifier data includes a model number or a serial number. At block 906, a second communications link is formed with a remote computing device.

At block 908, the user device identifier is transmitted to the remote computing device. At block 910, one or more messages are received from the remote computing device to transmit to the user device for output to the user. In one example, the one or more messages are associated with an instruction related to usage of the user device and the user action is processed to determine whether the instruction has been properly completed by the user.

At block 912, a user action is received from the user device to transmit to the remote computing device, the user action made responsive to the one or more messages. In one example, the user action is a voice message or an input action received at a user device user interface.

While the exemplary embodiments of the present invention are described and illustrated herein, it will be appreciated that they are merely illustrative and that modifications can be made to these embodiments without departing from the spirit and scope of the invention. Certain examples described utilize headsets which are particularly advantageous for the reasons described herein. In further examples, other devices, such as other body worn devices may be used in place of headsets, including wrist-worn devices. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method for user device operation comprising:
   retrieving from a computer memory at a user device a user device identifier data;
   dialing over a communications network a remote computing device comprising an interactive voice response (IVR) system;
   transmitting the user device identifier data over the communications network to the remote computing device;
   outputting one or more voice messages received from the interactive voice response system at the user device, the one or more voice messages comprising one or more instructions how to operate a telephony function of the user device; and
   transmitting a user action made at the user device performing the one or more instructions to the remote computing device over the communications network, the user action made responsive to the one or more voice messages, the user action operable to be processed by the remote computing device to determine whether the telephony function of the user device has been correctly operated by the user according to the one or more instructions.

2. The method of claim 1, wherein the user device identifier data comprises a model number or a serial number.

3. The method of claim 1, further comprising retrieving data at the remote computing device associated with the user device.

4. The method of claim 1, wherein dialing the remote computing device comprises retrieving a dial-in number for the remote computing device.

5. The method of claim 1, wherein the user action is a voice message or an input action received at a user device user interface of the user device.

6. The method of claim 1, wherein the one or more voice messages from the interactive voice response system further comprise one or more instructions how to test a proper operation of a telephony function of the user device.

7. The method of claim 6, wherein the telephony function comprises a call connect function or a voice transmit function.

8. The method of claim 6, wherein a user action is operable to test the proper operation of the telephony function of the user device.

9. The method of claim 1, further comprising:
   terminating the call with the remote device;
   receiving a call back call at the user device from the remote computing device; and
   receiving a user action responsive to the call back call, the user action operable to test a proper user operation or a proper device operation of the user device.

10. The method of claim 1, further comprising Bluetooth pairing the user device with a local device, wherein dialing the remote computing device occurs during Bluetooth pairing.

11. The method of claim 10, wherein the user device is a headset and the local device is a smartphone.

12. The method of claim 1, wherein the user action is a voice response, wherein voice response is processed by remote computer to determine a signal processing parameter.

13. One or more non-transitory computer-readable storage media having computer-executable instructions stored thereon which, when executed by one or more computers, cause the one more computers to perform operations comprising:

forming a first communications link between a computing device and a user device having a user device memory;

receiving over the first communications link a user device identifier data stored in the user device memory;

forming a second communications link between the computing device and a remote computing device, the remote computing device comprising an interactive voice response (IVR) system;

receiving over the second communications link one or more voice messages from the interactive voice response system to transmit to the user device over the first communications link for output to a user, wherein the one or more voice messages comprise one or more instructions how to test a proper operation of a function of the user device; and receiving a user action made at the user device from the user device at the computing device over the first communications link to transmit to the remote computing device over the second communications link, the user action made at the user device responsive to the one or more voice messages and operable to be processed by the remote computing device to test the proper operation of the function of the user device.

14. The one or more non-transitory computer-readable storage media of claim 13, wherein the user device identifier data comprises a model number or a serial number.

15. The one or more non-transitory computer-readable storage media of claim 13, wherein forming the second communications link comprises dialing the remote computing device, the operations further comprising:
terminating the second communications link;
receiving a call from the remote computing device; and
receiving a user call action responsive to the call.

16. The one or more non-transitory computer-readable storage media of claim 13, wherein the user action is a voice message or an input action received at a user device user interface.

17. The one or more non-transitory computer-readable storage media of claim 13, wherein the one or more voice messages from the interactive voice response system further comprises one or more instructions how to operate a function of the user device or adjust a device operational setting.

18. The one or more non-transitory computer-readable storage media of claim 13, wherein a user device setting at the user device is adjusted responsive to testing the proper operation of the user device.

19. The one or more non-transitory computer-readable storage media of claim 13, wherein the one or more voice messages from the interactive voice response system are associated with an instruction related to usage of the user device and the user action is processed to determine whether the instruction has been properly completed by the user.

20. The one or more non-transitory computer-readable storage media of claim 13, wherein the user device is a headset and the computing device comprises a smartphone.

21. One or more non-transitory computer-readable storage media having computer-executable instructions stored thereon which, when executed by one or more computers, cause the one more computers to perform operations comprising:

forming a first communications link between a computing device and a user device having a user device memory;

receiving over the first communications link a user device identifier data stored in the user device memory;

forming a second communications link between the computing device and a remote computing device;

receiving one or more messages from the remote computing device over the second communications link to transmit to the user device over the first communications link for output to a user, wherein the one or more messages comprise one or more instructions how to correctly operate a function of the user device or adjust a telephony setting of the user device; and receiving a user action made at the user device from the user device at the computing device over the first communications link to transmit to the remote computing device over the second communications link, the user action made responsive to the one or more messages and the user action operable to be processed to determine whether the one or more instructions have been properly completed by the user.

22. The one or more non-transitory computer-readable storage media of claim 21, wherein the user device identifier data comprises a model number or a serial number.

23. The one or more non-transitory computer-readable storage media of claim 21, wherein the user action is a voice message or an input action received at a user device user interface.

* * * * *